May 7, 1940.　　　　A. KEGRESSE　　　　2,199,523
CLUTCH WITH HYDRAULICALLY COMPRESSED DISKS
Filed Jan. 18, 1939
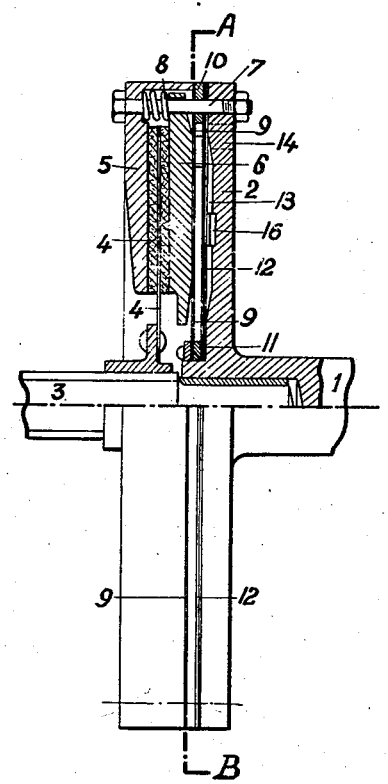
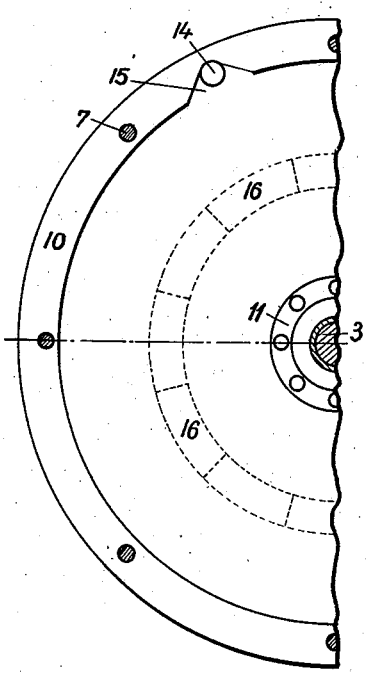
Inventor
A. KEGRESSE
By
Young, Emery & Thompson
Attorneys Patented May 7, 1940

2,199,523

UNITED STATES PATENT OFFICE 2,199,523

CLUTCH WITH HYDRAULICALLY COMPRESSED DISKS

Adolphe Kégresse, Paris, France

Application January 18, 1939, Serial No. 251,641
In France January 20, 1938

4 Claims. (Cl. 192—88)

This invention relates to improvements in and relating to clutches with hydraulically compressed disks.

It is well known that in clutches with rotating disks which are hydraulically compressed by means of a diaphragm the hydraulic pressure works, on the one hand, on a rigid wall and, on the other hand, on the said diaphragm. The latter is elastically deformed under the action of the pressure and tends to bend.

This elastical deformation of the diaphragm is used in order to act on a movable plate which on moving in the axial direction compresses a disk, thus producing the engagement of the clutch.

Now it has been found in practice that such a device lacked elasticity to such a point that it was, in fact, of no use.

This invention has for its object to provide an improvement in and relating to this kind of clutch in order to give the device the desired elasticity without affecting its operation in any prejudicial manner.

An embodiment of this invention is shown by way of example in the accompanying drawing, in which Figure 1 is a side view, part in longitudinal section, of a clutch according to this invention, and Figure 2 is a half elevational and partly sectional view.

In the appended drawing the clutch is shown in the position of engagement.

Referring to Figure 1, I represents the driving shaft which carries a plate 2, which can be a flywheel, and 3 is the driven shaft. This latter receives the coupling disk 4, which is hydraulically compressed between the fixed plate 5, which is fixed to the shaft I, and the movable plate 6 which is rotated by its periphery, for instance by means of the connecting bolts 7. The movable plate 6 has its face which is opposed to the disk 4 resting on a circular diaphragm 9 by means of springs 8. The diaphragm 9 is connected with the plate 2 of the shaft I through stay washers 10 for the periphery and 11 for the centre.

A second diaphragm which will be called counter-diaphragm and which is thicker than the first one is shown at 12 and provided between the stay washers 10, 11 and the plate 2. This latter forms on its face which is facing the diaphragms a cup 13 adapted to receive small springs 16 (shown in chain lines in Figure 2) and serving to strengthen the elasticity of the counter-diaphragm 12.

The fluid flows into the circular space formed by both diaphragms 9 and 12, for instance at the periphery, through the duct 14 and the notch 15 which is provided in the stay washer 10.

The operation is as follows:

When starting the fluid begins to fill the annular space between both diaphragms 9 and 12. As soon as the pressure begins to rise the diaphragm 9 is elastically deformed outwardly and thus shifts the movable plate 6. This latter then engages the coupling disk 4 which is thus compressed between the plates 6 and 5.

As soon as the stroke of the movable plate 6 is arrested by the beginning of the compression of the disk 4, the fluid pressure in the annular space between both diaphragms tends to rise. At this moment the counter-diaphragm 12 begins to act. Since this counter-diaphragm is thicker than the diaphragm 9 it begins later to be deformed, thus tending to adapt itself to the form of the cavity 13 of the plate 2 when the movable plate 6 has engaged the disk 4, thus preventing the pressure from rising suddenly in the annular space between both diaphragms. Thus, the compression of the coupling disk 4 is effected progressively and with all the desired smoothness.

It is easy to conceive that the elasticity of the counter-diaphragm 12 plays here an important part and that the smoothness of the engagement of the clutch depends on this elasticity.

In fact, it has been found in practice that by varying the thickness of the counter-diaphragm it was possible to obtain all the desired range of smoothness.

A satisfactory result is also obtained when the elasticity of the counter-diaphragm is varied by the addition of small blade springs (as shown by way of example in the drawing) or other elastic members located between the said counter-diaphragm and the rigid plate 2, the cavity 13 being provided for this purpose.

The above given description and the appended drawing relate to a simple clutch, but, of course, the above described device may be applied to multiple clutches as well or to clutch groups as the groups which are found, for instance, in certain automatic change speed gears.

I claim:

1. In a clutch having disks which are hydraulically shifted in the axial direction through the medium of a yieldable diaphragm forming a chamber for the fluid under pressure, a second yieldable diaphragm which is more rigid than the first one and forms the wall of the fluid chamber which is opposed to the first diaphragm.

2. In a clutch having disks which are hydraulically shifted in the axial direction through the medium of a yieldable diaphragm forming a chamber for the fluid under pressure, a second diaphragm which is more rigid than the first one and forms the wall of the fluid chamber which is opposed to the first diaphragm, the said second diaphragm being carried by an axially fixed plate which forms a recess corresponding to the play of the said diaphragm, and springs inserted between the bottom of the said recess and the second diaphragm in order to modify the conditions of flection of the latter.

3. In a clutch having disks which are hydraulically shifted in the axial direction through the medium of a yieldable diaphragm forming a chamber for the fluid under pressure, a second yieldable diaphragm which is more rigid than the first one and forms the wall of the fluid chamber which is opposed to the first diaphragm, and means for limiting the expansion of the second diaphragm.

4. In a clutch having disks which are hydraulically shifted in the axial direction, a backing plate having an annular cavity in one face thereof, a diaphragm covering said cavity, a disk shifting diaphragm axially spaced from the cavity covering diaphragm and forming therewith a fluid chamber, the disk shifting diaphragm being more yieldable than the cavity covering diaphragm whereby upon the introduction of fluid into the chamber the disk shifting diaphragm will be fully actuated and then the cavity covering diaphragm will be forced into the cavity.

ADOLPHE KÉGRESSE.